A. T. BOLTON.
PRODUCT NUMBER INDICATOR.
APPLICATION FILED JAN. 14, 1910.
1,021,965.
Patented Apr. 2, 1912.
2 SHEETS—SHEET 1.
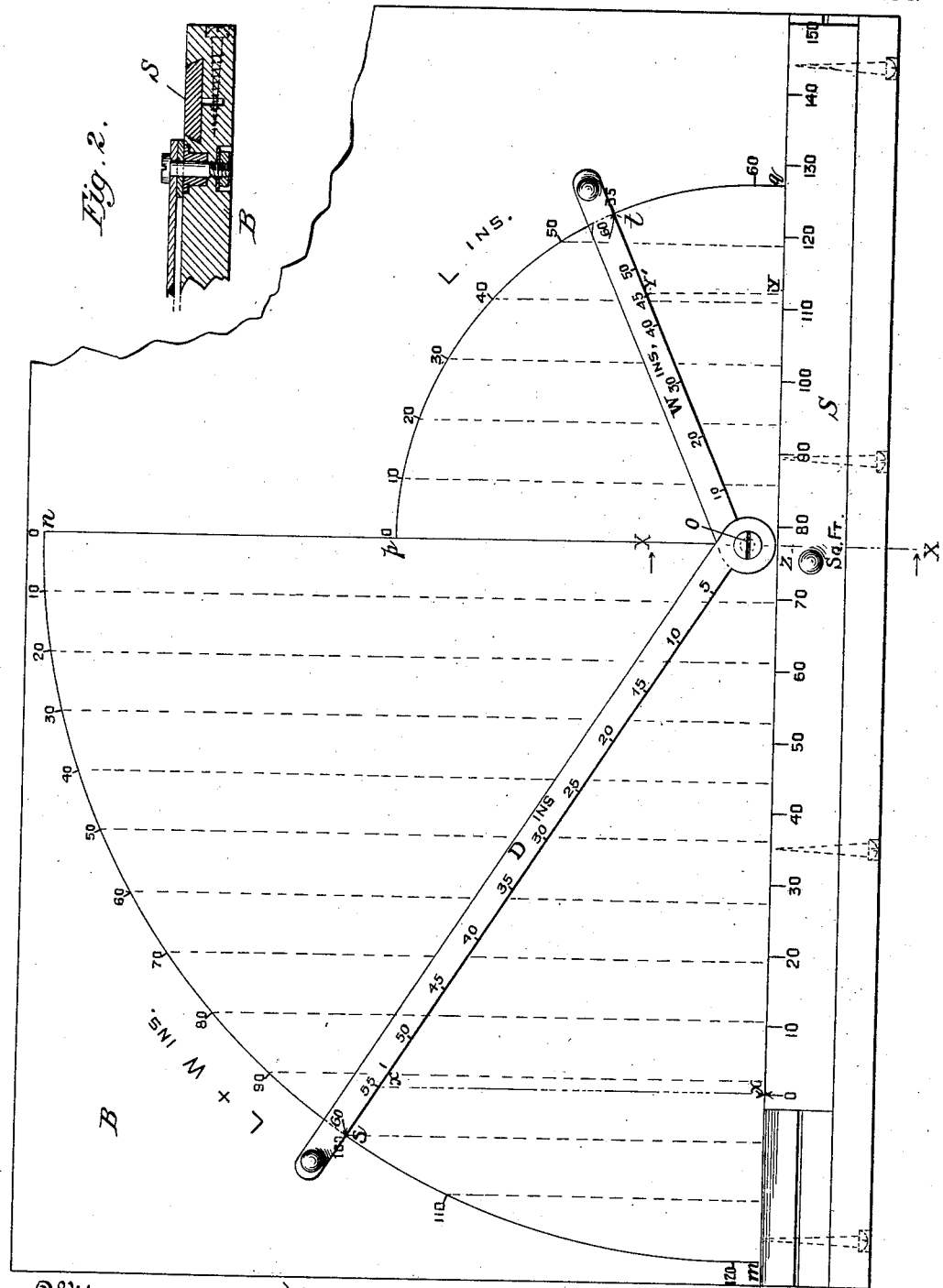

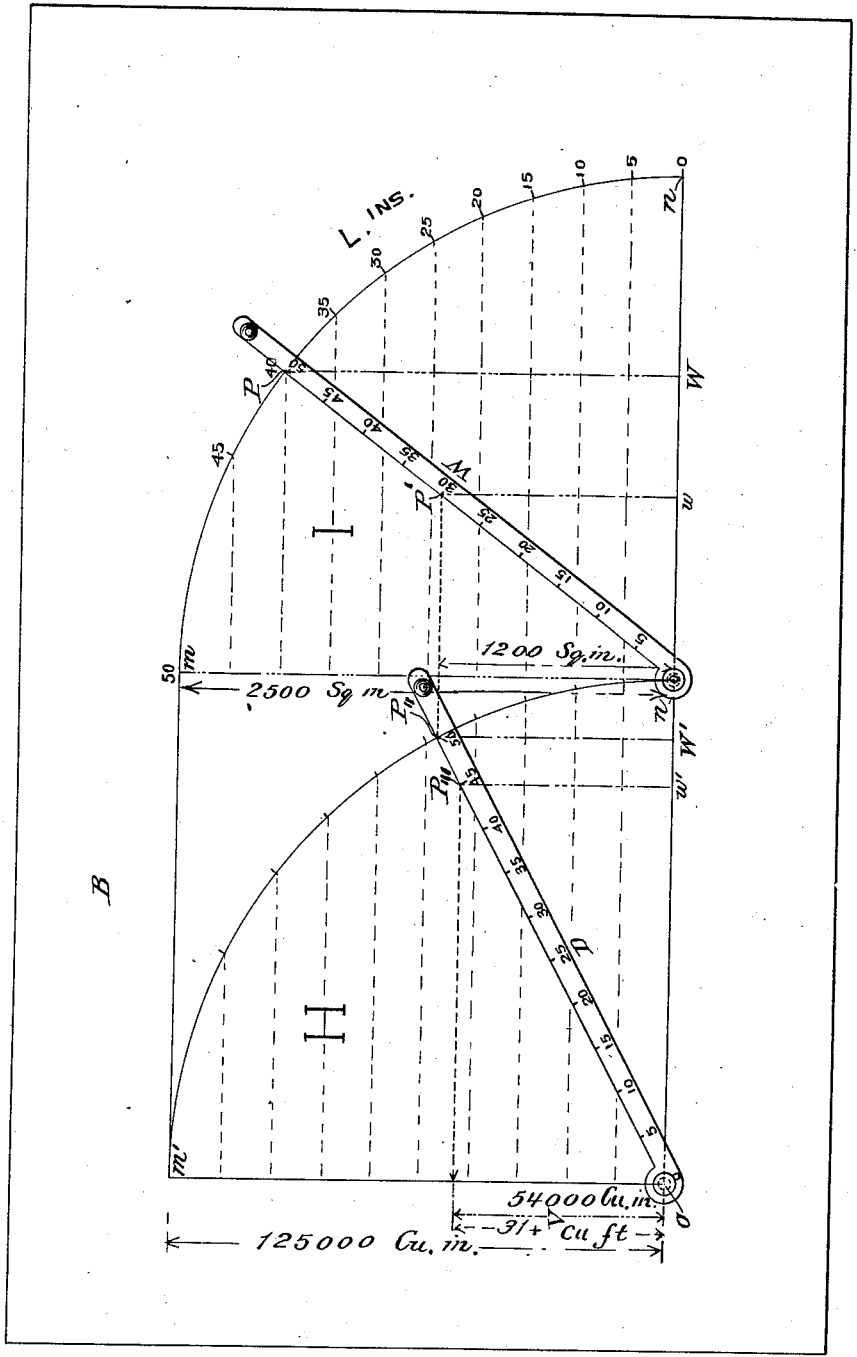

UNITED STATES PATENT OFFICE.

ARTHUR T. BOLTON, OF NEW YORK, N. Y.

PRODUCT-NUMBER INDICATOR.

1,021,965.  Specification of Letters Patent.  Patented Apr. 2, 1912.

Application filed January 14, 1910. Serial No. 538,124.

*To all whom it may concern:*

Be it known that I, ARTHUR T. BOLTON, a citizen of the United States, and resident of New York, borough of Bronx, county and State of New York, have made a new and useful Invention in Product-Number Indicators, of which the following is a specification.

My invention has for its object, to provide a novel device for giving an accurate visual indication of the products of two or more numbers without necessitating any mental calculation, and it has an especial utility in connection with the measurement of surfaces and volumes.

The invention will be fully understood by referring to the accompanying drawings, in which, Figure 1 is a plan view illustrating the application of my novel device to the measurement of square surfaces or areas; and, Fig. 2 is a detail sectional view taken through Fig. 1 on the line X—X and as seen looking thereat from left to right, in the direction of the arrows; Fig. 3 being a view similar to Fig. 1 illustrating the application of my improvement to the measurement of volumes, as for instance, rectangular shaped boxes, rooms, or in fact interior volumes of any rectangular dimensions.

Referring now to the drawings in detail and first to Fig. 1 which represents my improvement as applied to the measurement of the surfaces of rectangular shaped boxes, rooms, or like areas having six surfaces, B represents a board of sufficient dimensions to support the operative parts of the device which consists of two quadrants illustrated on the board either by drawing or painting the same thereon, or by placing them thereon in any preferred manner, said quadrants being represented by the letters $nmo$ and $pqo$ having the relative positions shown and with their bases in alinement with each other so as to constitute one continuous base $mzq$, beneath which is located a sliding scale S secured in a dove-tailed slot, as clearly indicated in Fig. 2. The length of said scale in this particular instance is shown as extending from 0 to 150 and it is calibrated to represent square feet, being of the same structural length as the combined base line $mzq$. The bases of the two quadrants are divided into equal spaces, there being shown twelve such spaces in the large quadrant and six in the small quadrant; dotted lines are then drawn, as shown, so as to intersect the arcs $n$ $m$ and $p$ $q$. The points where these lines intersect these arcs are numbered in the first instance from 0 to 120 and in the second from 0 to 60, it being noted that these numbers in each instance are ten times the number of spaces. Two pivoted arms are then secured at the junction and near the bases of the quadrants at the point $o$, said arms being indicated respectively as $s$ $o$ and $o$ $t$. The arm $s$ $o$ is the same length as the base line $m$ $z$ of the large quadrant and the arm $o$ $t$ is of the same length as the base line $z$ $q$ of the smaller quadrant, but the arm of the smaller quadrant is only one-half the length of the arm of the large quadrant.

The arm $s$ $o$ is designed to indicate in inches, in this instance, the depth D of the box or space to be measured, and the arm $o$ $t$ the width W of such box or space; while the letters L+W at the left hand side of the quadrant $nmo$ are designed to indicate the summation of the length and width in inches of the box or surface to be measured and as indicated by the numerals 0 to 120 on the arc $nmo;$ also the length of the box is indicated by 0 to 60, or by the letter L in inches at the right hand of the smaller quadrant.

To make a single application of the invention, suppose it is desired to measure the interior surface of a box having a length of 55 inches, a width of 45 inches, and a depth of 55 inches. The operator rotates the arm $s$ $o$ over the large quadrant until its lower edge touches the arc at the point 100 which, it will be noted, is the summation of the length and the width; (55+45) *i. e.* one hundred. He then looks upon the arm $s$ $o$ for the depth, namely, 55 inches, and ascertains where the edge cuts a vertical line extending to the base and as indicated by the letters $x^1$ $x$. He then rotates the arm $o$ $t$ on the smaller quadrant until the lower edge thereof coincides with the length of the box; namely, at the point 55, and ascertains where the lower edge of this arm cuts a vertical line $y^1$ $y$ extending from the point 45 to the scale S beneath the base line $zq$. He then slides the scale S until the point O corresponds with the point $x$ and a point $y$ beneath $y^1$ on the scale and this gives visual indication that the inside area of the box is 110 sq. ft. plus. In like manner the superficial area of any other box of any size, within the maximum dimensions of depth, width, and length provided for by the indicating dimensions of this device, may be ascertained.

In Fig. 3 of the drawings I have shown how I apply my invention to the measurement of rectangular shaped volumes; as, for instance, the interior volumes of boxes or rooms. In this application of the invention the quadrant indicated by the letter I is designed to measure square surfaces, the same as the quadrant $pqo$ in Fig. 1, and is operated in the same way; while the second quadrant indicated by the letter H is designed to give the cubical contents, as indicated by the letter V on the extreme left. To make a specific application, the rotatable arms are set on the quadrants I and H so as to indicate the proper volume at the end of the operation for a box having the dimensions 40″×30″×45″, the product of the three being represented finally at the left hand of the quadrant H by the letter V in cubic feet, as 31 ft. plus. In order to obtain these products the rotatable arm in the quadrant I is moved with its upper edge to the point P where 40, the length of the box is indicated. The operator then notes the position of the point $P^1$ where 30, the width of the box is indicated on this arm, and follows with his eye a line parallel with one of the horizontal dotted lines in the quadrant I until he notes its intersection with the arc $m^1 n$ at $P_{11}$ of the second quadrant H. He then rotates the arm of the second quadrant until the upper edge thereof coincides with the point where the line just referred to intersects this arc and notes finally the position of the point $P_{111}$ or where 45, the depth of the box is indicated on the arm in the quadrant H, and causes his eye to follow the dotted line parallel with the dotted lines in said quadrant until he notes the intersection with the vertical line $m^1 o$ on the extreme left, so that the distance between this intersection and the point $o$ indicated by the letter V gives the cubic contents 54,000 cubic inches or 31 cubic feet plus. It will, of course, be apparent that for the purpose of giving the indication in cubic feet a properly calibrated scale bearing the proper proportions for converting these values into cubic feet should be applied, as was the similar scale S applied to Fig. 1 for converting the values in that figure to square feet.

My invention, although herein shown and described as applicable to the visual indication of the measurement of square surfaces and cubical contents has a general use in the arts for enabling one to ascertain quickly and without mental computation not only such measurements, but also the summations of such smaller surfaces as may be needed in use generally in the arts; as for instance, computing the number of rolls of wall paper to cover the interior walls of a room, or the summation of such cubical contents as may be needed; as, for instance the number of bricks or stones of definite dimensions for use in buildings, etc., the scale S in each particular instance being calibrated to indicate the quantities and the characters it is designed to give. In fact my improvement is designed generally as a rapid computing device for enabling one to mechanically and visually give summations which would ordinarily require considerable time to ascertain mentally.

Having thus described my invention what I claim and desire to secure by Letters Patent of the United States is—

A product number indicator, for visually showing the surface area of a rectangular volume, embracing two quadrants adjacent to each other and each provided with a rotatable arm carrying dimensional spaces, said arms being pivoted near the bases and at the junction of the sides of said quadrants; the united bases of said quadrants being divided into a definite number of equal spaces; the arcs of said quadrants being divided into dimensional spaces located at the intersection of lines vertically drawn from the ends of the divisional base spaces; together with a slidable scale located below said bases.

In testimony whereof I have signed my name to this specification in the presence of two subscribing witnesses.

ARTHUR T. BOLTON.

Witnesses:
C. J. KINTNER,
M. F. KEATING.